(12) United States Patent
Uesaka et al.

(10) Patent No.: US 6,977,700 B2
(45) Date of Patent: Dec. 20, 2005

(54) CIRCULAR POLARIZATION PLATE AND LIQUID CRYSTAL DISPLAY DEVICE

(75) Inventors: Tetsuya Uesaka, Yokohama (JP); Eiji Yoda, Yokohama (JP); Takehiro Toyooka, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 0 days.

(21) Appl. No.: 10/333,323

(22) PCT Filed: Jul. 4, 2001

(86) PCT No.: PCT/JP01/05815

§ 371 (c)(1),
(2), (4) Date: Feb. 19, 2003

(87) PCT Pub. No.: WO02/06863

PCT Pub. Date: Jan. 24, 2002

(65) Prior Publication Data

US 2003/0164921 A1 Sep. 4, 2003

(30) Foreign Application Priority Data

Jul. 14, 2000 (JP) .............................. 2000-214556

(51) Int. Cl.⁷ ................... G02F 1/13363; G02F 1/1335

(52) U.S. Cl. ....................... 349/114; 349/96; 349/98; 349/113; 349/117; 349/177

(58) Field of Search ..................... 349/117, 118, 119, 349/177, 128, 127, 124, 98; 428/1.1, 1.3, 428/1.31

(56) References Cited

U.S. PATENT DOCUMENTS 5,805,253 A    9/1998   Mori et al. ................. 349/118

FOREIGN PATENT DOCUMENTS

| EP | 0982621 | 3/2000 |
| JP | 1068816 | 3/1998 |
| JP | 2000-321576 | * 11/2000 |

OTHER PUBLICATIONS

Patent Abstracts of Japan, publication No. 2001-091951, publication date Apr. 6, 2001.
Patent Abstracts of Japan, publication No. 2000-154261, publication date Jun. 6, 2000.

(Continued)

*Primary Examiner*—Robert H. Kim
*Assistant Examiner*—Tai Duong
(74) *Attorney, Agent, or Firm*—Adams & Wilks

(57) ABSTRACT

A transflective liquid crystal display has a liquid crystal cell having a liquid crystal layer sandwiched between a pair of transparent substrates each provided with an electrode. A first polarizer is disposed on a viewer's side of the cell. At least one optical retardation compensator is disposed between the polarizer and the cell. A transflector is disposed behind the viewer's side of the liquid crystal layer. A circular polarizer is provided behind the viewer's side of the transflector. The circular polarizer comprises a second polarizer and an optical anisotropic element having a phase difference of approximately ¼ wavelength in the visible light region. The optical anisotropic element has a liquid crystal film with a fixed nematic hybid orientation structure and a stretched film.

12 Claims, 8 Drawing Sheets

OTHER PUBLICATIONS

Patent Abstracts of Japan, publication No. 2000-131680, publication date May 12, 2000.

Patent Abstracts of Japan, publication No. 2001-111914, publication date Apr. 21, 2000.

Patent Abstracts of Japan, publication No. 2000-073063, publication date Mar. 7, 2000.

Patent Abstracts of Japan, publication No. 10-206846, publication Aug. 7, 1998.

* cited by examiner

CIRCULAR POLARIZATION PLATE AND LIQUID CRYSTAL DISPLAY DEVICE

CROSS-REFERENCE TO RELATED APPLICATIONS

This application is a U.S. national stage application of copending International Application No. PCT/JP01/05815, filed Jul. 4, 2001, claiming a priority date of Jul. 14, 2000, and published in a non-English language.

BACKGROUND OF THE INVENTION

1. Field of the Invention

The present invention relates to circular polarizers and liquid crystal displays provided with the same.

2. Background Information

In recent years, liquid crystal displays have been expected to become increasingly used in the field of displays for personal digital assistants (PDA), for example, where their thin and lightweight characteristics can be fully exploited. Since such personal digital assistants (PDA) are generally driven with batteries, it has been necessary to keep the electricity to be consumed by them as low as possible. Therefore, attention has been drawn particularly to reflective type liquid crystal displays for the personal digital assistants which are free of or need not use at all times an electricity-consuming back light and can be reduced in electricity consumption, thickness, and weight.

There have been widely used reflective type liquid crystal displays with two polarizers for black-and-white display in which a liquid crystal cell is sandwiched between a pair of polarizers and a reflector is disposed the outside of one of the polarizers. Furthermore, recently a reflective type liquid crystal display with a single polarizer in which a liquid crystal layer is sandwiched between a polarizer and a reflector has been proposed and practically used because it is brighter in principle than those with two polarizers and is easy to be colored as reported in JAPAN DISPLAY, 192 (1989) by T. Sonehara et al. However, these reflective type liquid crystal displays have a drawback that the displayed images become invisible when they are used in a dark place because they usually display the images using light from the outside of the displays.

To solve this problem, there has been proposed a transflective liquid crystal display with a single polarizer in which a transflector is used to transmit part of an incident light instead of the reflector, and a back light is provided, as described in Japanese Patent laid Open Publication No. 10-206846. Therefore, this display can be used as a reflective type, i.e., in a reflection mode using light from the outside when the back light is not turned on and as a transmission type, i.e., in a transmission mode using the back light under dark situations.

The transflective liquid crystal display with a single polarizer needs to make substantially circularly polarized light incident on the liquid crystal cell through the transflector in the transmission mode. Therefore, it is necessary to dispose a circular polarizer comprising one or more polymeric stretched films typically formed of polycarbonates and a polarizer between the transflector and the back light. However, in the transmission mode of a TN-LCD, there is a problem relating to viewing angle in that the displayed images are changed in color and decreased in contrast when viewed obliquely, due to the birefringence peculiar to the liquid crystal molecules and it is essentially difficult to enlarge the viewing angle with a circular polarizer having polymeric stretched films.

SUMMARY OF THE INVENTION

An object of the present invention is to provide a circular polarizer for a transflective display which has excellent circular polarization properties and a transflective liquid crystal display which is bright in the transmission mode, high in contrast, and less dependence on the viewing angle.

That is, the present invention relates to a circular polarizer for a transflective display comprising at least a polarizer, and an optical anisotropic element having a phase difference of approximately ¼ wavelength in the visible light region wherein the optical anisotropic element comprises at least a liquid crystal film with a fixed nematic hybrid orientation structure.

The present invention also relates to a circular polarizer for a transflective display wherein the liquid crystal film is obtained by aligning a liquid crystalline material in a liquid crystalline state so as to assume a nematic hybrid phase and cooling the material as it is so as to fix the nematic hybrid orientation in a glassy state.

The present invention also relates to the circular polarizer wherein the liquid crystal film is one obtained by aligning a liquid crystalline material in a liquid crystalline state so as to assume a nematic hybrid phase and then photo- or thermal-crosslinking the material so as to fix the nematic hybrid orientation.

The present invention also relates to a circular polarizer for a transflective display wherein the optical anisotropic element comprises at least a liquid crystal film with a fixed nematic hybrid orientation structure and a stretched film.

Furthermore, the present invention relates to a transflective liquid crystal display having the aforementioned circular polarizer.

The present invention also relates to a transflective liquid crystal display which comprises at least a liquid crystal cell formed by sandwiching a liquid crystal layer between a pair of transparent substrates each provided with an electrode, a polarizer disposed on the viewer's side of the cell, at least one optical retardation compensator disposed between the polarizer and the cell, and a transflector disposed behind the viewer's side of the liquid crystal layer wherein at least the aforementioned circular polarizer is provided behind the viewer's side of the transflector.

The present invention also relates to the transflective liquid crystal display using a twisted nematic mode.

The present invention also relates to the transflective liquid crystal display using a super twisted nematic mode.

The present invention also relates to the transflective liquid crystal display using a HAN (Hybrid Aligned Nematic) mode.

DETAILED DESCRIPTION OF THE PREFERRED EMBODIMENTS

The circular polarizer of the present invention is comprised of at least a polarizer and an optical anisotropic element having a phase difference of approximately ¼ wavelength in the visible light region.

No particular limitation is imposed on the polarizer as long as the objects of the present invention can be achieved. Therefore, there may be properly used conventional ones generally used in a liquid crystal display. Specific examples are PVA-based polarizing films such as polyvinyl alcohol (PVA) and partial acetal PVA, polarizing films such as those obtained by stretching a hydrophilic polymeric film comprising a partially saponified product of an ehtylene-vinyl acetate copolymer and absorbing iodine and/or dichroic dye, and those comprising a polyene-oriented film such as a dehydrated product of PVA and a dechlorinated product of polyvinyl chloride. Alternatively, there may be used reflective polarizers.

Figure 14:
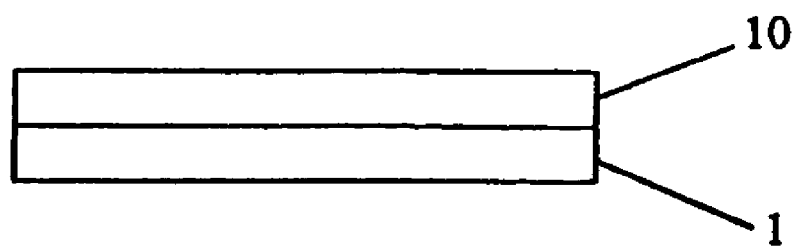
FIG. 14 is a schematic view showing a transparent protective layer provided on the polarizer.

These polarizers may be used independently or in combination with a transparent protective layer (see 10 in FIG. 14) provided on one or both surfaces of the polarizer for the purpose of enhancing the strength, moisture resistance, and heat resistance. Examples of the protective layer are those formed by laminating a transparent plastic film such as polyester and triacetyl cellulose directly or via an adhesive layer on the polarizer; coated layers of resin; and acrylic- or epoxy-based photo-setting type resin layers. When the protective layers are coated on both surfaces of the polarizing film, they may be the same or different.

The optical anisotropic element constituting the circular polarizer of the present invention is comprised of at least one liquid crystal film with a fixed nematic hybrid orientation structure and is an element having a phase difference of approximately ¼ wavelength in the visible light region.

In the liquid crystal film with a fixed nematic hybrid orientation structure, the absolute value of the angle formed by the directors of the liquid crystalline molecules and the film surface in the vicinity of one film interface is generally 60° to 90°, preferably 80° to 90°, while the absolute value of the angle in the vicinity of the opposing film interface is generally 0 to 50°, preferably 0 to 30°. The absolute value of the average tilt angle in the orientation structure is generally 5° to 35°, preferably 7° to 33°, more preferably 10° to 30°, and most preferably 13° to 27°. The average tilt angle, if deviating from the above range, would cause the decrease of contrast of the resulting liquid crystal display in which the circular polarizer is provided. The term "average tilt angle" used herein denotes the average value of the angles between the directors of the liquid crystalline molecules in the liquid crystal film thickness and a film plane and can be determined by applying a crystal rotation method. The liquid crystal film is one with a fixed nematic hybrid orientation structure in which the directors of the liquid crystalline molecules are directed at different angles in all the positions in the film thickness direction as described above. Therefore, there no longer exists optical axis in the whole film structure.

The retardation value of the liquid crystal film depends on the mode of a liquid crystal display in which the film is arranged as the circular polarizer and various optical parameters and thus can not be determined with certainty. However, the retardation is within the range of generally 10 nm to 600 nm, preferably 30 nm to 400 nm, and more preferably 50 nm to 300 nm with respect to a single color light of 500 nm. A retardation value of less than 10 nm would possibly fail to enlarge the viewing angle of the resulting liquid crystal display in which the circular polarizer is provided. A retardation value of more than 600 nm would cause unnecessary coloration in the resulting liquid crystal display in which the circular polarizer is provided when viewing the display obliquely. The term "retardation value" used herein denotes a pseudo retardation value in the plane of a liquid crystal film when viewing the display from the normal direction. That is, in a liquid crystal film with a fixed nematic hybrid orientation structure, the refractive index ($n_e$) parallel to the directors is different from ($n_o$) perpendicular to the directors. Therefore, the value obtained by subtracting $n_o$ from $n_e$ is defined as a pseudo birefringence, and the retardation value is determined by the product of the birefringence and the absolute film thickness. Generally, this retardation value is easily obtained by a polarization optical measurement such as ellipsometry.

The thickness of the liquid crystal film can not be determined with certainty because it depends on the mode and various optical parameters of a liquid crystal display wherein the film is provided as the circular polarizer. However, the thickness is generally from 0.2 μm to 10 μm, preferably from 0.3 μm to 5 μm, and more preferably 0.5 μm to 2 μm. The thickness of less than 0.2 μm would possibly fail to obtain an effect to enlarge the viewing angle. The thickness of more than 10 μm would probably cause the resulting liquid crystal display to be colored undesirously.

The liquid crystal film may be obtained by aligning a liquid crystalline material exhibiting nematic liquid crystallinity in a liquid crystalline state so as to assume a nematic hybrid orientation and fixing the orientation structure by photo- or thermal-crosslinking or cooling, depending on the various physical properties of the material.

No particular limitation is imposed on the type of the liquid crystalline material as long as it exhibits nematic liquid crystallinity. Therefore, various low molecular weight liquid crystalline substances, polymeric liquid crystalline substances, and mixtures thereof can be used in the present invention. It does not matter whether the molecular shape of the liquid crystalline material is like bar or disc. Therefore, there may be used discotic liquid crystalline materials exhibiting discotic liquid crystallinity. In the case of using a mixture of these materials, no particular limitation is imposed on the composition and ratio of the materials as long as the desired nematic hybrid orientation structure can be formed with these materials and can be fixed. For example, there may be used a mixture comprising one or more types of low molecular weight- and/or polymeric-liquid crystalline substances and one or more types of low molecular weight- and/or polymeric- non-liquid crystalline substances or various additives.

Examples of the low molecular weight liquid crystalline substance are those having Schiff base-, biphenyl-, terphenyl-, ester-, thioester-, stillbene-, tolan-, azoxy-, azo-, phenyl cyclohexane-, trimesic acid-, triphenylene-, torquecene-, phthalocyanine-, or porphrin-molecular chain and mixtures thereof.

Eligible polymeric liquid crystalline substances are various main chain type- and side chain type-polymeric liquid crystalline substances and mixtures thereof. Examples of the main chain type polymeric liquid crystalline substance are polyester-, polyamide-, polycarbonate-, polyimide-, polyurethane-, polybenzoimidazole-, polybenzoxazole-, polybenzothiazole-, polyazomethine-, polyesteramide-, polyestercarbonate-, and polyesterimide-based polymeric liquid crystalline substance. Among these, particularly preferred are semi-aromatic polyester-based liquid crystalline polymers wherein mesogen providing liquid crystallinity is alternately bonded to a flexible chain, such as polymethylene, polyethyleneoxide, and polysiloxane and wholly aromatic polyester-based liquid crystals which are free of flexible chain.

Examples of the side chain type polymeric liquid crystalline substances are those having a straight- or cyclic-main chain and a mesogen at each side, such as polyacrylate-, polymethacrylate, polyvinyl-, polysiloxane-, polyether-, polymalonate-, and polyester-based liquid crystals and mixtures thereof. Among these, particularly preferred are those wherein a mesogen providing liquid crystallinity is bonded to the main-chain via a spacer comprised of a flexible chain and those having a molecular structure wherein the main chain and the side chain both have a mesogen.

In the case of fixing the orientation structure formed in a liquid crystalline state by photo- or thermal crosslinking during the preparation of the liquid crystal film, the liquid crystalline material is desirously blended with various liquid crystalline substances having functional groups or sites which are reactive by photo- or thermal crosslinking. Examples of such functional groups are epoxy groups such as acryl, methacryl, vinyl, vinyl ether, allyl, allyloxy, and glycidyl groups, isocyanate, thioisocyanate, azo, diazo, azido, hydroxyl, carboxyl, and lower ester groups. Particularly preferred are acryl and methacryl groups. Examples of the crosslinkable site are those containing molecular structures of maleimide, maleic anhydride, cinnamic acid, cinnamate, alkene, diene, allene, alkyne, azo, azoxy, disulfide, or polysulfide. Although these crosslinkable groups or sites may be contained in various liquid crystalline substances constituting the liquid crystal material, a non-liquid crystalline substance containing the crosslinkable groups or sites may be added to the liquid crystalline material.

Figure 15:
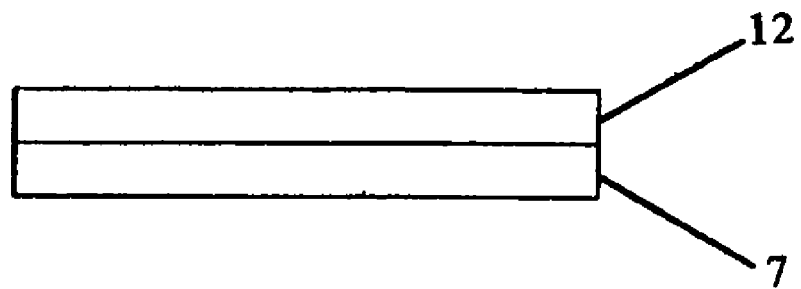
FIG. 15 is a schematic view showing a transparent protective layer provided on the liquid crystal film.

As described above, the optical anisotropic element constituting the circular polarizer of the present invention is comprised of at least a liquid crystal film with a fixed nematic hybrid orientation structure. Although the liquid crystal film alone can be used as the optical anisotropic element, the circular polarizer may be comprised of the liquid crystal film whose one or both surfaces are covered with a transparent protective layer (see 12 in FIG. 15) for the purpose of enhancing the strength and resistance. Examples of such a transparent protective layer are those formed by laminating a transparent plastic film such as polyester and triacetyl cellulose directly or via an adhesive layer on the polarizer; coated layers of resin; and acrylic- or epoxy-based photo-setting type resin layers. When the protective layers are coated on both surfaces of the liquid crystal film, they may be the same or different. Alternatively, the liquid crystal film may be formed directly on the polarizer and then may be used as the circular polarizer as it is. For example, a liquid crystal film is laminated over a transparent plastic film such as polyester and traicetyl cellulose and then integrated with a polarizing film thereby obtaining a circular polarizer with a structure of a polarizing film/a transparent plastic film/an optical anisotropic element (liquid crystal film) or a polarizing film/an optical anisotropic element (liquid crystal film)/a transparent plastic film.

Alternatively, the optical anisotropic element constituting the circular polarizer of the present invention may be comprised of a liquid crystal film with a fixed nematic hybrid orientation structure and a stretched film.

Examples of such a stretched film are mediums exhibiting uni- or bi-axial properties which may be various polymeric stretched films such as polycarbonate (PC), polymethacrylate (PMMA), and polyvinyl alcohol (PVA). The circular polarizer of the present invention may be obtained by combining the optical anisotropic element comprised of the stretched film and the liquid crystal film with the polarizer.

The optical anisotropic element may be comprised of one or more of the above-mentioned liquid crystal films and one or more of the above-mentioned stretched films.

The circular polarizer of the present invention is comprised of at least the above-described polarizer and optical anisotropic element. The thickness of the circular polarizer can not be determined with a certainty because it depends on various optical parameters requisite for a liquid crystal display wherein the circular polarizer is provided or the optical anisotropic element is comprised of a laminate selectively of the liquid crystal film alone or of the combination thereof with the stretched film depending on the requisite display qualities. However, the thickness is usually 600 $\mu$m or less, preferably 500 $\mu$m or less, more preferably 400 $\mu$m or less, and even more preferably 300 $\mu$m or less.

In addition to the polarizer and the optical anisotropic element, the circular polarizer may contain one or more protective layers, anti-reflection layers, anti-glare treated layers, hard coat layers, adhesive layers, pressure-sensitive adhesive layers, light diffusing layers, and light-diffusive adhesive layers.

Because the liquid crystal film constituting the optical anisotropic element of the circular polarizer of the present invention is a film with a fixed nematic hybrid orientation structure, the upper and lower portions of the film are not optically equal. Therefore, the optical characteristics of the circular polarizer differ depending on which surface of the liquid crystal film is located on the polarizer side. No particular limitation is imposed on which surface of the liquid crystal film is located on the polarizer side. However, the circular polarizer of the present invention is preferably produced in view of the optical characteristics requisite for the circular polarizer and the display characteristics requisite for a liquid crystal display provided with the circular polarizer.

The liquid crystal display of the present invention has at least the above-described circular polarizer. In general, a liquid crystal display is constituted by a polarizer, a liquid crystal cell, and if necessary an optical retardation compensator, a reflective layer, a photo diffusing layer, a back light, a front light, a light-controlled film, a light guide plate, a prism sheet or the like. However, no particular limitation is imposed on the structure of the liquid crystal display of the present invention except that the above-described circular polarizer is necessarily provided. No particular limitation is imposed on the position of the circular polarizer and it may, therefore, be arranged on one or more portions in the display.

No particular limitation is imposed on the liquid crystal cell. There may be used a conventional liquid crystal cell in which a liquid crystal layer is sandwiched by a pair of transparent substrates each having an electrode.

No particular limitation is imposed on the transparent substrate as long as it aligns the liquid crystalline material forming the liquid crystal layer in a specific direction. Specifically, there may be used either a transparent substrate having properties to align the liquid crystal or a transparent substrate having no such properties but provided with an alignment film or the like having such properties. Electrodes for the cell may be conventional ones. Generally, the electrode can be provided on the surface contacting the liquid crystal layer, of the transparent substrate. In the case of using a transparent substrate having an alignment film, the electrode may be provided between the substrate and the alignment film.

No particular limitation is imposed on the liquid crystalline material forming the liquid crystal layer. Therefore, there may be used conventional various low molecular weight- and polymeric liquid crystalline substances and mixtures thereof. The liquid crystalline material may be blended with a dye, a chiral dopant, and a non-liquid crystalline substance to an extent that the liquid crystallinity is not adversely affected.

In addition to the electrode substrates and the liquid crystal layer, the liquid crystal cell may be provided with various components which are necessary to obtain various modes of liquid crystal cells described hereinbelow.

Such liquid crystal cell modes are exemplified by TN (Twisted Nematic), STN (Super Twisted Nematic), ECB (Electrically Controlled Birefringence), IPS (In-Plane Switching), VA (Vertical Alignment), OCB (Optically Compensated Birefringence), HAN (Hybrid Aligned Nematic), and ASM (Axially Symmetric Aligned Microcell) modes, Half Tone Gray Scale mode, Domain Dividing mode, and display modes using a ferrodielectric liquid crystal and an antiferrodielectric liquid crystal.

No particular limitation is imposed on the driving mode of the liquid crystal cell. Therefore, it may be a passive matrix mode used in an STN-LCD, an active matrix mode using active electrodes such as TFT (Thin Film Transistor) electrodes and TFD (Thin Film Diode) electrodes, and a plasma address mode.

No particular limitation is imposed on the optical retardation compensator used in the liquid crystal display as long as it has excellent transparency and uniformity. There may be preferably used polymeric stretched films and optical compensation films formed from liquid crystal. Examples of the polymeric stretched films are uniaxial or biaxial optical retardation films formed with cellulose-, polycarbonate-, polyallylate-, polysulfone-, polyacryl, polyethersulfone-, or cyclic olefin-based polymers. Among these, polycarbonate-based polymers are preferred in terms of cost and film uniformity.

No particular limitation is imposed on the optical compensation film as long as it is a film which can utilize an optical anisotropy generating from a state wherein a liquid crystal is aligned. For example, there may be used various conventional optically functional films using nematic or discotic liquid crystal or smectic liquid crystal.

One or more of the optical retardation compensators exemplified herein may be used in the liquid crystal display. A polymeric stretched film and a liquid crystal optical compensation film may be used together.

No particular limitation is imposed on the reflection layer used in the liquid crystal display. Therefore, the reflection layer may be a metal such as aluminum, silver, gold, chromium, and platinum, an alloy containing one or more of these metals, an oxide such as magnesium oxide, a laminate of films of dielectrics, a liquid crystal film exhibiting a selective reflectivity, and combinations thereof. These reflection layers may be flat or curved and may be those provided with diffusive reflectivity by forming rugged patterns on its surface, those having a function as the electrode on the electrode substrate located on the side opposite to the viewing side, transflectors which are made thin or provided with holes so as to transmit a part of light, or any combination thereof.

No particular limitation is imposed on the light diffusing layer as long as it has properties to diffuse an incident light isotropically or anisotropically. For example, there may be used those comprising two or more regions and having a refractive index difference therebetween or those having on their surfaces rugged patterns. Examples of the light diffusing layer comprising two or more regions and having a refractive index difference therebetween are those wherein particles having a different refractive index from those of matrixes are dispersed therein. The light diffusing layer itself may have adhesive properties.

Although not restricted, the thickness of the light diffusing layer is usually 10 $\mu$m or more and preferably 500 $\mu$m or less.

The total light transmittance of the light diffusing layer is preferably 50 percent or more and particularly preferably 70 percent or more. The haze value of the layer is usually 10 to 95 percent, preferably 40 to 90 percent, and more preferably 60 to 90 percent.

No particular limitation is imposed on the back light, front light, light-controlled film, light guide plate, and prism sheet used for the liquid crystal display. Therefore, they may be conventional ones.

In addition to the above-described components, the liquid crystal display of the present invention may be provided with additional components. For example, the use of a color filter makes it possible to produce a color liquid crystal display which can provide multi- or full-colored images with increased color purity.

Particularly preferably, the liquid crystal display of the present invention is a transflective liquid crystal display comprising a liquid crystal cell formed by sandwiching a liquid crystal layer between a pair of transparent substrates each provided with an electrode, a polarizer disposed on the viewer's side of the cell, at least one optical retardation compensator disposed between the polarizer and the cell, and a transflector disposed behind the viewer's side of the liquid crystal layer wherein the aforementioned circular polarizer is provided behind the viewer's side of the transflector. This type of liquid crystal display can operates both in reflection and transmission modes by arranging a back light on the rear of the circular polarizer.

For example, in the case of using a TN-LCD mode liquid crystal cell, the resulting liquid crystal display is preferably provided with two sheets of the above-described polymeric stretched film as the optical retardation compensator and/or one sheet of the optical compensation film formed by the above-described liquid crystal because excellent images can be obtained.

In the liquid crystal display, excellent display characteristics can be obtained by providing the diffusing layer between the polarizer and the liquid crystal cell or using a diffusion reflective transflector as the electrode of the liquid crystal cell.

The twisted angle of the TN-LCD mode liquid crystal cell is usually 30 degrees or larger and 85 degrees or smaller, preferably 45 degrees or larger and 80 degrees or smaller, and more preferably 55 degrees or larger and 70 degrees or smaller because excellent display characteristics can be obtained in combination with the circular polarizer of the present invention.

Because the liquid crystal film constituting the optical anisotropic element of the circular polarizer of the present invention to be arranged in various liquid crystal displays is a film with a fixed nematic hybrid orientation structure, the upper and lower portions of the film are not optically equal. Therefore, the display characteristics of the liquid crystal display differ depending on which surface of the liquid crystal film is located on the polarizer side or on the combination thereof with the optical parameters of the liquid crystal cell or the like. No particular limitation is imposed on which surface of the liquid crystal film is arranged adjacent to the liquid crystal cell. However, the structure of the circular polarizer and conditions where it is arranged in a liquid crystal display are desirously determined in view of the optical parameters of the liquid crystal cell and the display characteristics requisite for a liquid crystal display in which the circular polarizer is provided.

Figure 1:
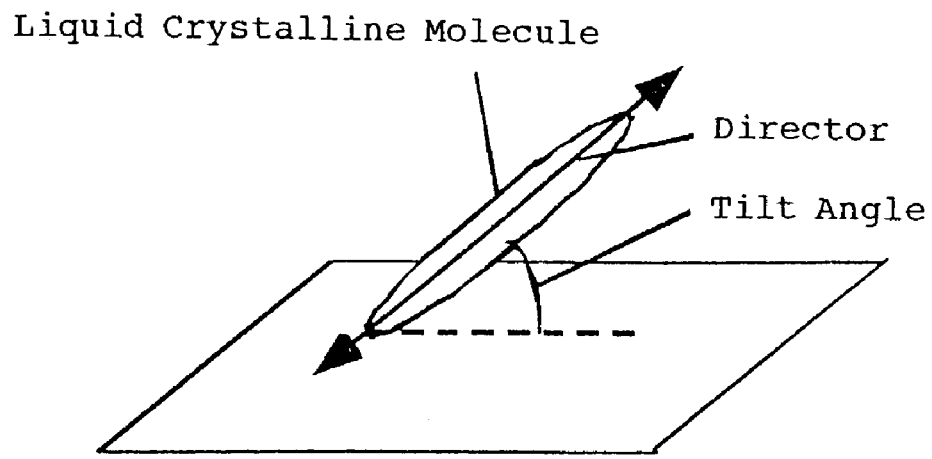
FIG. 1 is conceptual view for describing the tilt angle and twist angle of a liquid crystalline molecule.
Figure 2:
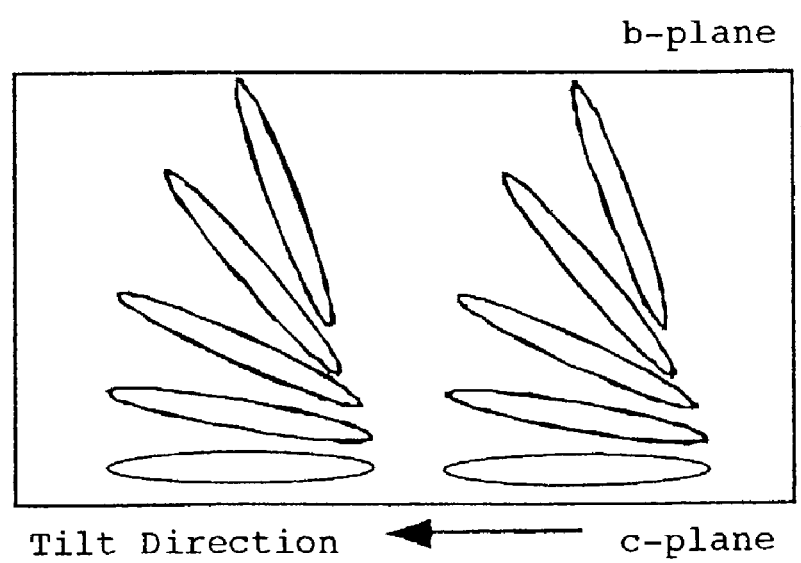
FIG. 2 is a conceptual view of the orientation structure of a liquid crystal film constituting a compensator.

The circular polarizer of the present invention is desirously arranged in view of the relation between the tilt direction (axis) of the liquid crystal film and the pre-tilt direction (orientation axis) of the liquid crystal cell in order to obtain a transflective liquid crystal display in which the characteristics of the circular polarizer can be exhibited more. The term "tilt direction (axis) of the liquid crystal film" used herein denotes a direction in which when viewing through the liquid crystal film from a b-plane side to a c-plane side as shown in FIG. 2, the director of a liquid crystalline molecule and the projection thereof on the c-plane forms an acute angle and which is parallel to the projection. Generally, a driving low molecular weight liquid crystal is not parallel to the interface of the cell and tilted at a certain angle which is generally referred to as "pre-tilt angle". However, a direction along which the director of a liquid crystalline molecule at the cell interface and the projection thereof form an acute angle and which is parallel to the projection is defined as "pre-tilt direction of the liquid crystal cell" in the present invention. In the transflective liquid crystal display, no particular limitation is imposed on the angle formed by the tilt direction (axis) of the liquid crystal film and the pre-tilt direction (orientation axis). However, it is desired to determine the axis arrangement of the circular polarizer and liquid crystal cell in view of the optical parameters of the liquid crystal cell and the display characteristics requisite for the liquid crystal display.

[Applicability in the Industry]

The circular polarizer of the present invention has wide viewing angle properties and a transflective liquid crystal cell using the circular polarizer can provide a bright image of high contrast in the transmission mode.

EXAMPLES

The present invention will be further described with reference to the following inventive and comparative examples but is not limited thereto. The retardations (Δnd) in the examples are values at a wavelength of 550 nm, unless stated otherwise.

Example 1

A circular polarizer was produced using a 1.32 μm thickness liquid crystal film 7 with a fixed nematic hybrid orientation wherein the average tilt angle in the thickness direction was 15 degrees. A TN-type transflective liquid crystal display with the structure shown in FIG. 3 was produced using the circular polarizer.

The liquid crystal cell 4 contained ZLI-1695 produced by Merck Ltd. as a liquid crystalline material and had cell parameters in which the cell gap is 3.5 μm, the twisted angle (left-handed twist) is 63 degrees, and the pre-tilt angle is 2 degrees.

A polarizer 1 with a thickness of 180 μm (SQW-862 manufactured by Sumitomo Chemical Industry Co., Ltd.) was arranged on the displaying side (upper portion in the drawing) of the liquid crystal cell 4, and optical retardation compensators 2 and 3 each formed by a uniaxially stretched polycarbonate film are arranged therebetween. Furthermore, a transflector 5 was arranged on the other side of the liquid crystal cell. Δnd of each of the optical retardation compensators 2 and 3 was approximately 280 nm and 140 nm, respectively. The angle θ2 formed by the orientation axis 41 of the liquid crystal cell and the slow axis 21 of the optical retardation compensator 2 was set at +58 degrees, while the angle θ3 formed by the orientation axis 41 of the liquid crystal cell and the slow axis 31 of the optical retardation compensator 3 was set at +118 degrees. The angle θ1 formed by the orientation axis 41 of the liquid crystal cell and the absorption axis 11 of the upper polarizer 1 was set at +133 degrees.

A circular polarizer 9 was arranged behind the viewer's side of the liquid crystal cell. The circular polarizer 9 was constituted by a lower polarizer 8, a uniaxially stretched polycarbonate film 6 (Δnd= approximately 140 nm), and a liquid crystal film 7 (Δnd=approximately 280 nm) with a fixed hybrid nematic orientation. The angle θ6 formed by the orientation axis 41 of the liquid crystal cell 4 and the slow axis 61 of the polycarbonate film 6 was set at +153 degrees, while the angle θ7 formed by the orientation axis 41 of the liquid crystal cell 4 and the tilt direction 71 of the liquid crystal film 7 was set at +32 degrees. The angle θ8 formed by the orientation axis 41 of the liquid crystal cell 4 and the absorption axis 81 of the lower polarizer was set at +47 degrees.

Furthermore, between the optical retardation compensator 3 and the liquid crystal cell 4 was arranged a scattering type adhesive layer whose total ray transmittance and haze value were 90 percent and 80 percent, respectively, having photo-diffusion properties.

Figure 4:
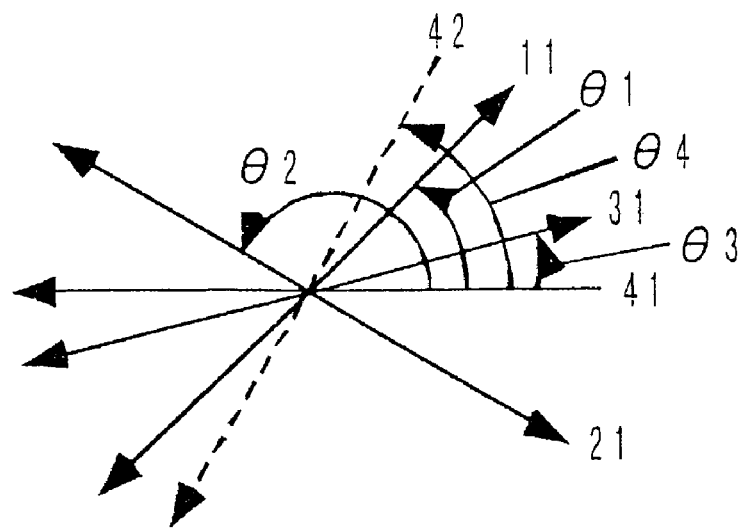
FIG. 4 is a plan view indicating the angular relations of the absorption axis of the polarizer, the orientation directions of the liquid crystal cell, and the slow axis direction of the optical retardation compensator in Example 1.
Figure 5:
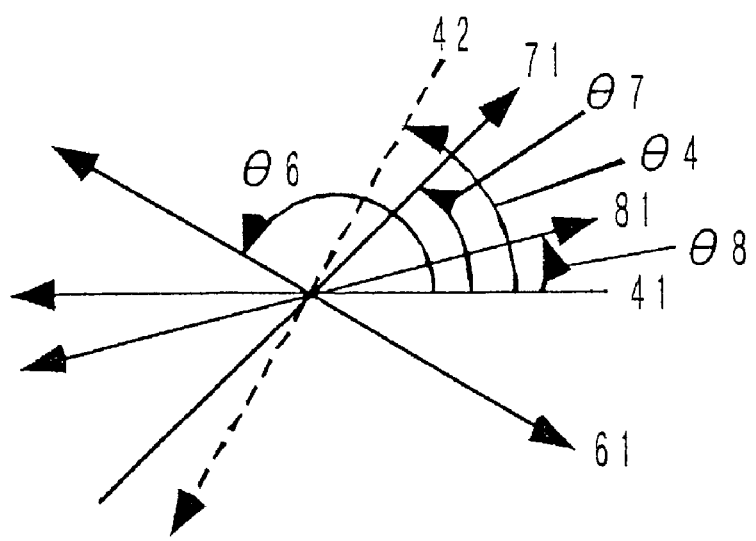
FIG. 5 is a plan view indicating the angular relations of the tilt direction of the liquid crystal film, the orientation axis of the liquid crystal cell, the optical axis of the polycarbonate film, and the absorption axis of the polarizer in Example 1.

The relations of the angles θ1 through θ8 in each of the components of the TN-type transflective liquid crystal display are shown in FIGS. 4 and 5.

In FIG. 4, the orientation direction 41 on the surface of the liquid crystal cell facing the polarizer 1 and the orientation direction 42 on the opposite surface form the angle θ4. The slow axis direction 21 of the optical retardation compensator 2 and the orientation axis 41 of the liquid crystal cell form the angle θ2. The slow axis direction 31 of the optical retardation compensator 3 and the orientation axis 41 of the liquid crystal cell form the angle θ3. The absorption axis 11 of the polarizer 1 and the orientation axis 41 of the liquid crystal cell form the angle θ1.

In FIG. 5, the tilt direction 71 of the liquid crystal film 7 in the circular polarizer 9 forms the angle θ7 with the orientation axis 41 of the liquid crystal cell. The optical axis 61 of the polycarbonate film 6 forms the angle θ6 with the orientation axis 41 of the liquid crystal cell. The absorption axis 81 of the polarizer 8 forms the angle θ8 with the orientation axis 41 of the liquid crystal cell.

Figure 6:
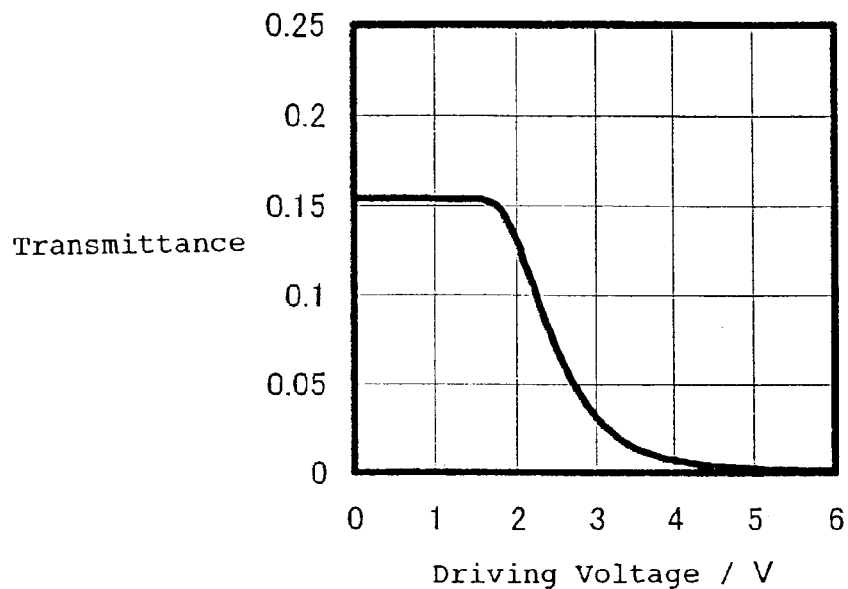
FIG. 6 is a graphical view indicating the transmittance of Example 1 with respect to various voltages.

FIG. 6 shows the transmittance with respect to a voltage applied when the back light of the transflective liquid crystal display obtained in Example 1 was on (transmission mode).

Figure 7:
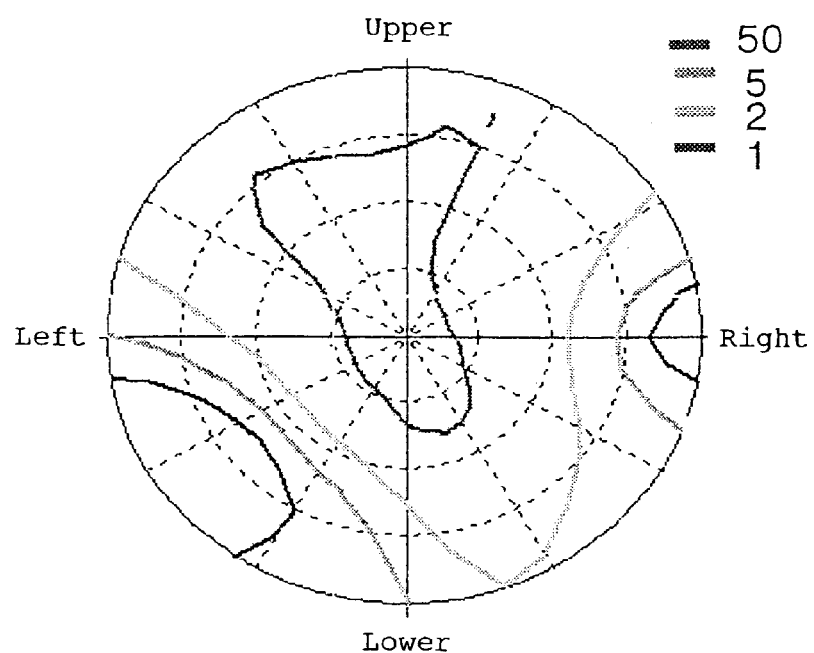
FIG. 7 is a view indicating the contrast ratio when viewing the transflective liquid crystal display of Example 1 from all the directions.

FIG. 7 shows the transmittance ratio (white image 0V)/(black image 6V) as the contrast ratio from all the directions when the back light is on (transmission mode).

Figure 8:
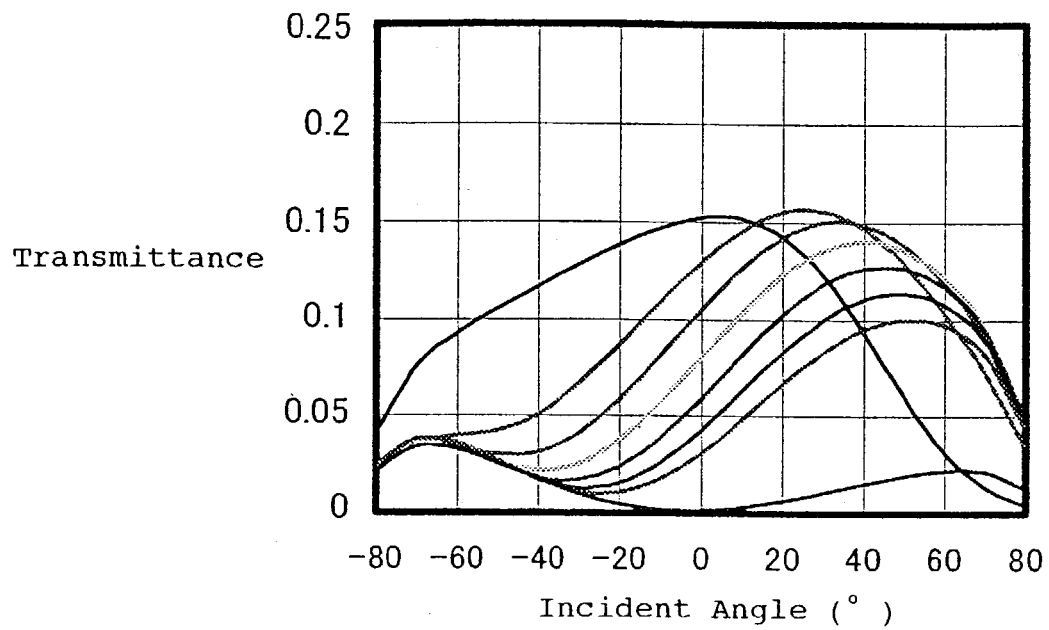
FIG. 8 shows the viewing angle properties of left and right direction transmittance of displayed images of eight gradation from 0V to 6V of the transflective liquid crystal display of Example 1.

FIG. 8 shows the viewing angle properties of transmittance of displayed images of eight gradations from a white image of 0V to a black image of 6V, in the left and right directions when the back light is on (transmission mode).

Figure 9:
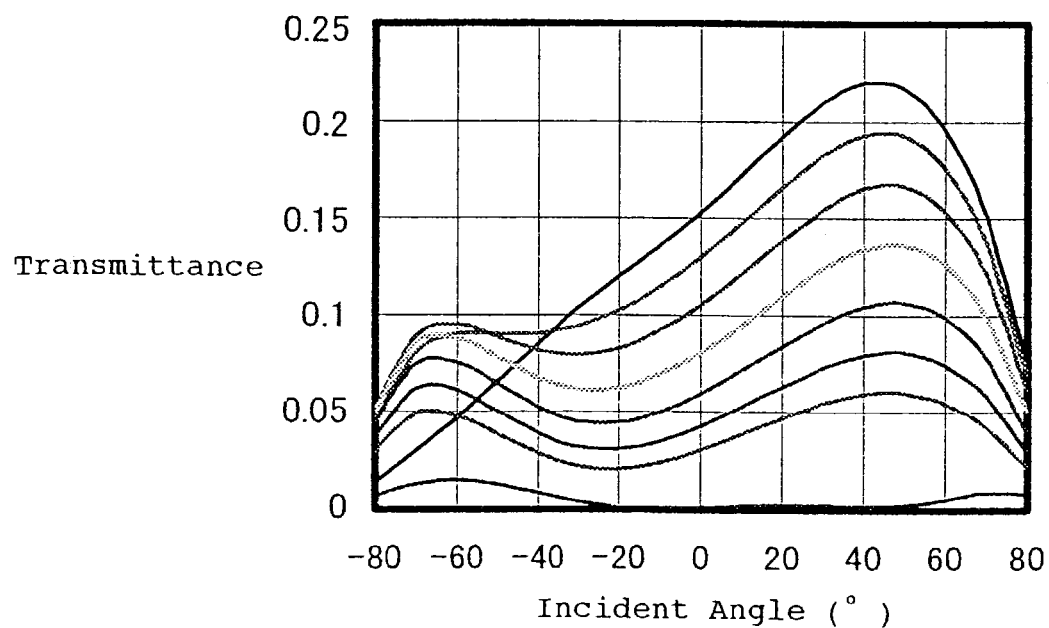
FIG. 9 shows the viewing angle properties of upper and lower direction transmittance of displayed image of eight gradations from 0V to 6V of the transflective liquid crystal display of Example 1.

FIG. 9 shows the viewing angle properties of transmittance of displayed images of eight gradations from a white image of 0V to a black image of 6V, in the upper and lower directions when the back light is on (transmission mode).

As apparent from the results shown in FIG. 6, the liquid crystal display of Example 1 could display bright and high contrast images in the transmission mode. Particularly, it was found that the liquid crystal display had excellent viewing angle properties in the transmission mode.

In this example, the experiments were conducted without using a color filter. However, it is needless to mention that a liquid crystal display provided with a color filter in the liquid crystal cell can display excellent multi-color or full-color images.

Furthermore, STN- and HAN mode transflection-type liquid crystal displays were produced and each had excellent display characteristics.

Comparative Example 1

Figure 3:
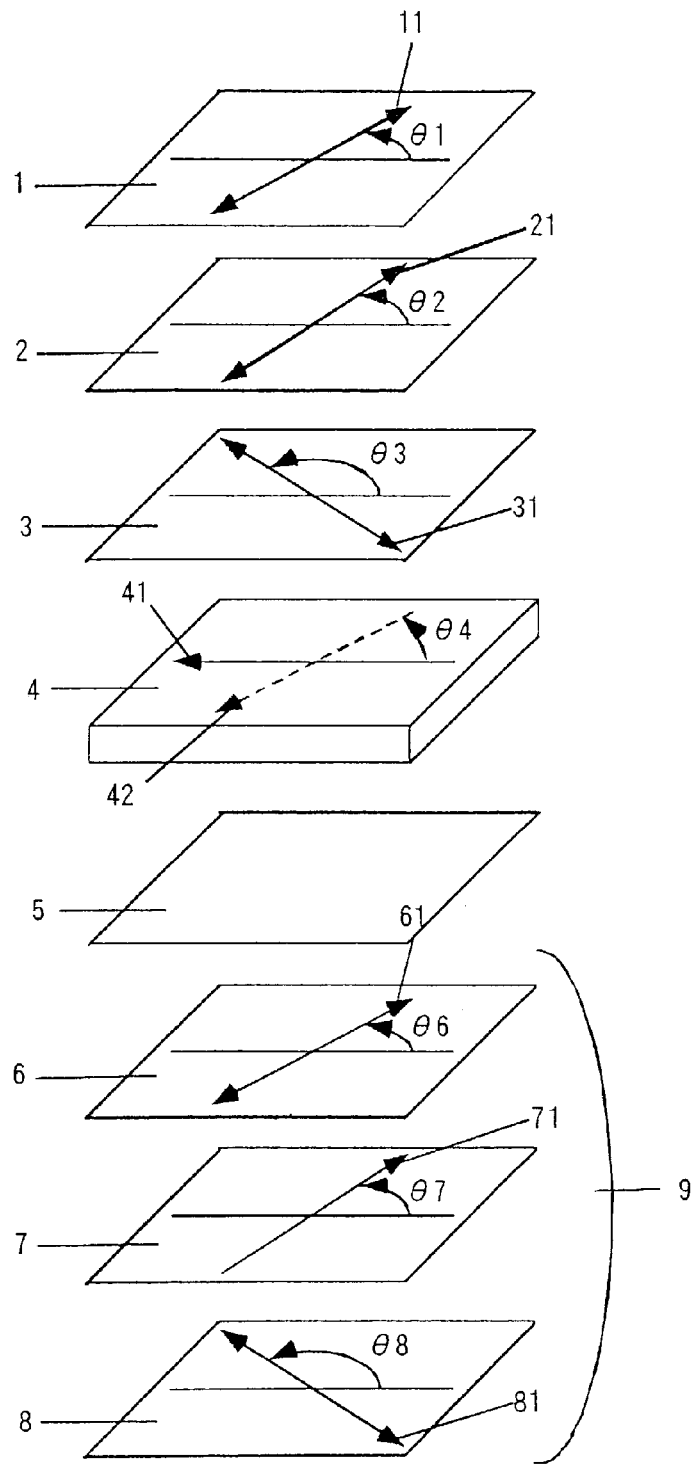
FIG. 3 is a schematic cross sectional view of the liquid crystal display of Example 1.

A liquid crystal display similar to that of Example 1 was produced except that in the structure shown in FIG. 3, the Δnd of the liquid crystal cell 4 was approximately 210 nm, the Δnd of each of the optical retardation compensators 2 and 3 was approximately 280 nm and 140 nm, respectively, the polycarbonate 6 (Δnd of approximately 140 nm) was the same as that of Example 1, a polycarbonate 7 (Δnd of approximately 280 nm) was used instead of the liquid crystal film 7, θ1=+133 degrees, θ2=+58 degrees, θ3=+118 degrees, θ4=+63 degrees, θ6=+153 degrees, θ7=+32 degrees, and θ8=+47 degrees.

Figure 10:
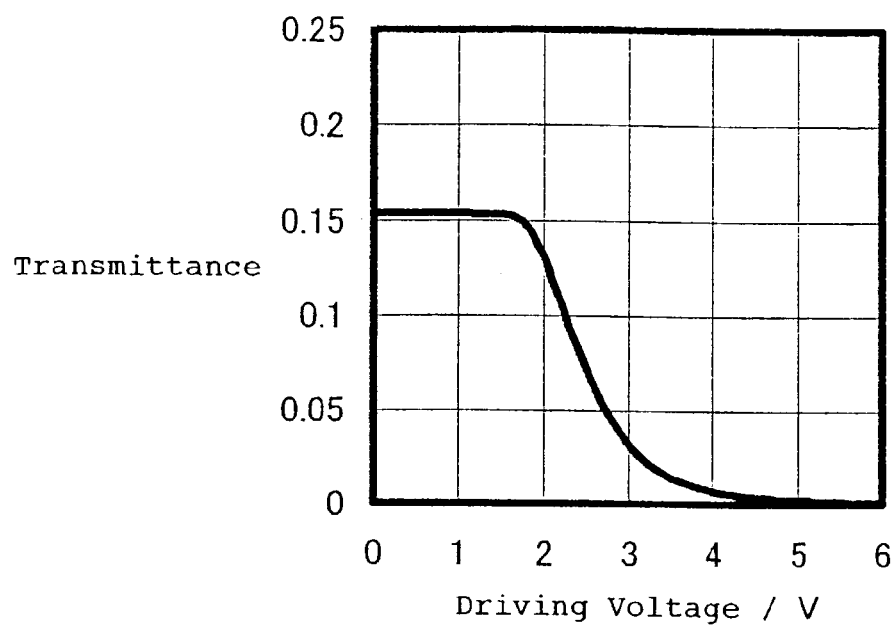
FIG. 10 is a graphical view indicating the transmittance of Comparative Example 1 with respect to various voltages.

FIG. 10 shows the transmittance with respect to a voltage applied when the back light of the transflective liquid crystal display of Comparative Example 1 was on.

Figure 11:
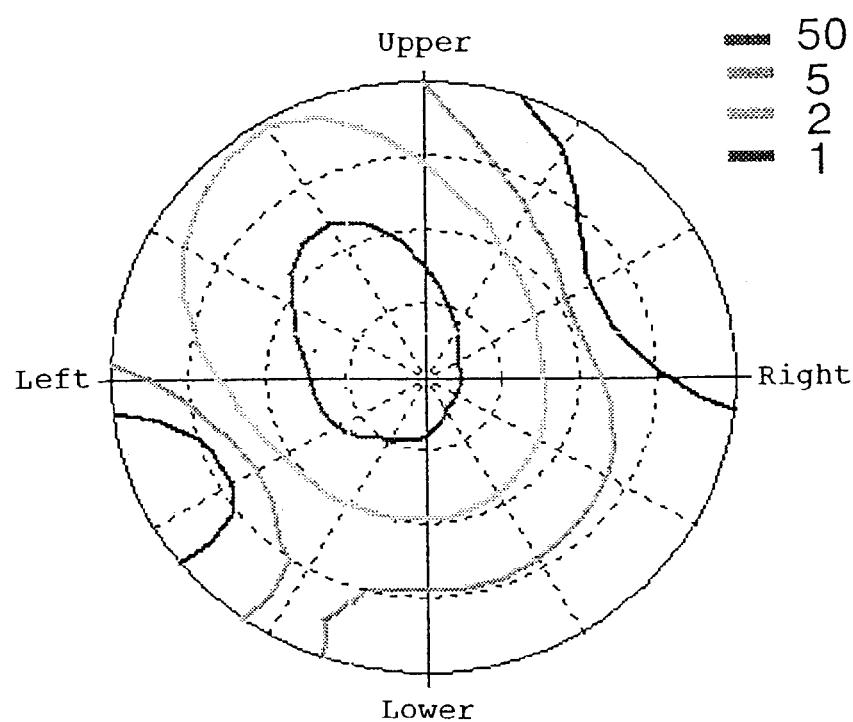
FIG. 11 is a view indicating the contrast when viewing the transflective liquid crystal display of comparative Example 1 from all the directions.

FIG. 11 shows the transmittance ratio (white image 0V)/(black image 6V) as the contrast ratio from all the directions when the back light is on (transmission mode).

Figure 12:
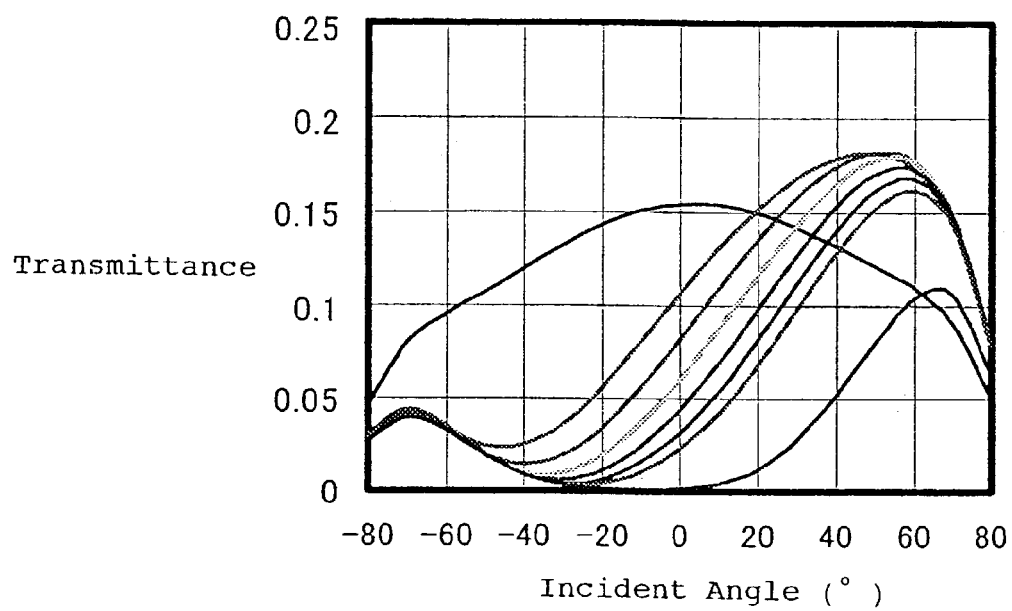
FIG. 12 shows the viewing angle properties of left and right direction transmittance of displayed images of eight gradations from 0V to 6V of the transflective liquid crystal display of Comparative Example 1.

FIG. 12 shows the viewing angle properties of transmittance of displayed images of eight gradations from a white image of 0V to a black image of 6V, in the left and right directions when the back light is on (transmission mode).

Figure 13:
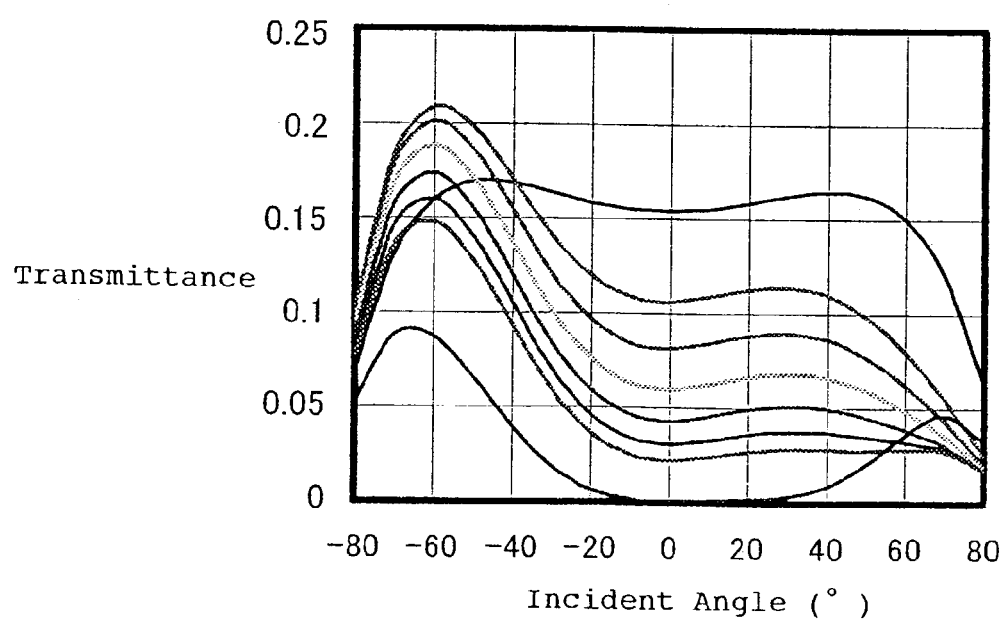
FIG. 13 shows the viewing angle properties of upper and lower direction transmittance of a displayed image of the transflective liquid crystal display of Comparative Example 1 indicated in eight gradations from 0V to 6V.

FIG. 13 shows the viewing angle properties of transmittance of displayed images of eight gradations from a white image of 0V to a black image of 6V, in the upper and lower directions when the back light is on (transmission mode).

As apparent from the results shown in FIG. 10, the liquid crystal display of Comparative Example 1 could display bright and high contrast images viewing from the front.

Example 1 and Comparative Example 1 were compared in terms of viewing angle properties.

When the contrast contours in all the directions of FIGS. 7 and 11 are compared, it is confirmed that wider viewing angle properties can be obtained using a liquid crystal film with a nematic hybrid structure for the circular polarizer.

When the upper and lower and left and right direction gradation properties which are used to be a drawback in the transmission mode of conventional displays are compared in FIGS. 8 and 9 and FIGS. 12 and 13, it is confirmed that the inversion properties are improved using the liquid crystal film with a nematic hybrid structure for the circular polarizer.

What is claimed is:

1. A transflective liquid crystal display comprising: a liquid crystal cell having a liquid crystal layer sandwiched between a pair of transparent substrates each provided with an electrode; a first polarizer disposed on a viewer's side of the cell; at least one optical retardation compensator disposed between the polarizer and the cell; a transflector disposed behind the viewer's side of the liquid crystal layer; and a circular polarizer provided behind the viewer's side of the transflector, the circular polarizer comprising a second polarizer and an optical anisotropic element having a phase difference of approximately ¼ wavelength in the visible light region, the optical anisotropic element comprising a liquid crystal film with a fixed nematic hybrid orientation structure and a stretched film.

2. A transflective liquid crystal display according to claim 1; wherein the liquid crystal film is formed by aligning a liquid crystalline material in a liquid crystalline state so as to assume a nematic hybrid phase and cooling the material to fix the nematic hybrid orientation in a glassy state.

3. A transflective liquid crystal display according to claim 1; wherein the liquid crystal film is formed by aligning a liquid crystalline material in a liquid crystalline state so as to assume a nematic hybrid phase and then photo- or thermal-crosslinking the material so as to fix the nematic hybrid orientation.

4. A transflective liquid crystal display according to claim 1; wherein the liquid crystal display is operable in a twisted nematic mode.

5. A transflective liquid crystal display according to claim 4; wherein the liquid crystal display is operable in a super twisted nematic mode.

6. A transflective liquid crystal display according to claim 4; wherein the liquid crystal display is operable in a HAN (Hybrid Aligned Nematic) mode.

7. A transflective liquid crystal display according to claim 1; wherein the first polarizer is one of a PVA-based polarizing film, a stretched hydrophilic polymeric film comprising a partially saponified product of an ethylene-vinyl acetate copolymer and an absorbing iodine or dichroic dye, or a polyene-oriented film.

8. A transflective liquid crystal display according to claim 1; wherein the first polarizer comprises a dehydrated product of PVA and a dechlorinated product of polyvinyl chloride.

9. A transflective liquid crystal display according to claim 1; wherein the first polarizer comprises one of a polyvinyl alcohol-based film or a partial acetal-based film.

10. A transflective liquid crystal display according to claim 1; further comprising a transparent protective layer provided on the first polarizer.

11. A transflective liquid crystal display according to claim 1; further comprising a transparent protective layer provided on the liquid crystal film.

12. A transflective liquid crystal display comprising: a liquid crystal cell comprised of a liquid crystal layer sandwiched between a pair of transparent substrates each provided with an electrode; a first polarizer disposed over a first side of the liquid crystal cell; a transflector disposed over a second side of the liquid crystal layer; and a circular polarizer comprising a second polarizer, and an optical anisotropic element having a phase difference of approximately ¼ wavelength in the visible light region, the optical anisotropic element comprising a liquid crystal film with a fixed nematic hybrid orientation structure and a stretched film, the transflector being disposed between the liquid crystal cell and the stretched film of the optical anisotropic element.

* * * * *